United States Patent [19]

Clemmons

[11] 4,008,789
[45] Feb. 22, 1977

[54] MULTI-BRAKE SHOE MEANS FOR A MULTI-BRAKING SURFACE BRAKED ASSEMBLY

[75] Inventor: Quentin T. Clemmons, Irwin, Pa.

[73] Assignee: Westinghouse Air Brake Company, Wilmerding, Pa.

[22] Filed: June 17, 1975

[21] Appl. No.: 587,740

[52] U.S. Cl. .............................. 188/70 R; 192/65
[51] Int. Cl.² ........................................ F16D 63/00
[58] Field of Search ............. 188/52, 58, 59, 70 R, 188/70 B, 71.1, 72.6, 72.7, 72.9, 74, 217; 192/65, 70.3, 79

[56] References Cited
UNITED STATES PATENTS

| 1,940,845 | 12/1933 | Conner et al. | 188/71.1 |
| 2,250,988 | 7/1941 | Eksergian | 188/59 X |
| 2,581,746 | 1/1952 | Baselt | 188/59 |
| 2,796,151 | 6/1957 | Bachman et al. | 188/70 B |
| 3,024,872 | 3/1962 | Uphues et al. | 188/33 X |
| 3,160,241 | 12/1964 | Newell | 188/52 X |
| 3,791,491 | 2/1974 | Tickle | 188/70 R |

FOREIGN PATENTS OR APPLICATIONS

1,284,193  11/1968  Germany ................. 188/72.6

*Primary Examiner*—George E. A. Halvosa
*Attorney, Agent, or Firm*—W. F. Poore; R. W. McIntire, Jr.

[57] ABSTRACT

This invention relates to a braking apparatus wherein the heat absorbing mass of a rotating braked element, such as a vehicle wheel, is increased by securing to, such as each wheel of the vehicle, a brake disc of such size as to constitute a heat sink capable of absorbing the heat generated by a pair of brake shoes when in braking engagement therewith, the periphery of the wheel forming a braking surface that is simultaneously engaged by a third brake shoe whereby the wheel constitutes a second heat sink capable of absorbing the heat generated by the third brake shoe.

12 Claims, 2 Drawing Figures

MULTI-BRAKE SHOE MEANS FOR A MULTI-BRAKING SURFACE BRAKED ASSEMBLY

BACKGROUND OF THE INVENTION

It has heretofore been proposed to increase the heat absorbing mass of a rotating braked element, such as a vehicle wheel, by securing a brake drum to the wheel and pressing a pair of brake shoes against the respective peripheries of the wheel and the drum when a brake application is effected.

When two brake shoes instead of a single brake shoe are used to transmit the same brake horsepower, longer shoe wear is obtained. Consequently, if two brake shoes are used to transmit the same amount of brake horsepower formerly transmitted by a single brake shoe, replacement of worn shoes with new shoes would be necessary less frequently. Since replacement of worn shoes with new shoes requires a considerable amount of time and work, it is, therefore, an expensive maintenance item. Hence, it is apparent that a brake apparatus employing one brake shoe for transmitting a first chosen amount of brake horsepower to the tread surface of a vehicle wheel and a pair of brake shoes for transmitting a second chosen amount of brake horsepower to one side of a brake disc secured to and rotatable with the wheel is to be preferred to a brake apparatus that employs one brake shoe for transmitting the first chosen amount of brake horsepower to the tread surface of the wheel and a second brake shoe for transmitting the second chosen amount of brake horsepower to the periphery of a brake drum.

Accordingly, it is the general purpose of this invention to provide a brake apparatus for each wheel of a vehicle that embodies three brake shoes, one of which, when a brake application is effected, is forced into braking engagement with the tread surface of a vehicle wheel while the other two are simultaneously forced into braking engagement with one side of a finned brake disc secured to this wheel.

SUMMARY OF THE INVENTION

According to the present invention, a brake apparatus, in which the brake horsepower transmitted to a rotating element to be braked, such as a wheel and axle assembly of a vehicle, is converted from mechanical energy into heat energy, comprises a movable brake beam carrying at each end thereof three brake shoes one of which, when the brake beam is moved toward the wheel and axle assembly, is pressed into braking engagement with the thread surface of one of the wheels of this assembly while the other two shoes are simultaneously pressed against the surface constituted by one side of a finned brake disc carried coaxially on the one wheel at locations on the one side of this disc that are off-set equal distances from and on the brake beam side of a line passing through the center of this one side of the disc and perpendicular to the line of action of the one brake shoe. Each of the two shoes is normally pressed against the one side of the finned brake disc with the same force which may be so selected as to be the same as, greater than or less than the force that presses the one shoe against the tread surface of the wheel.

Figure 1:
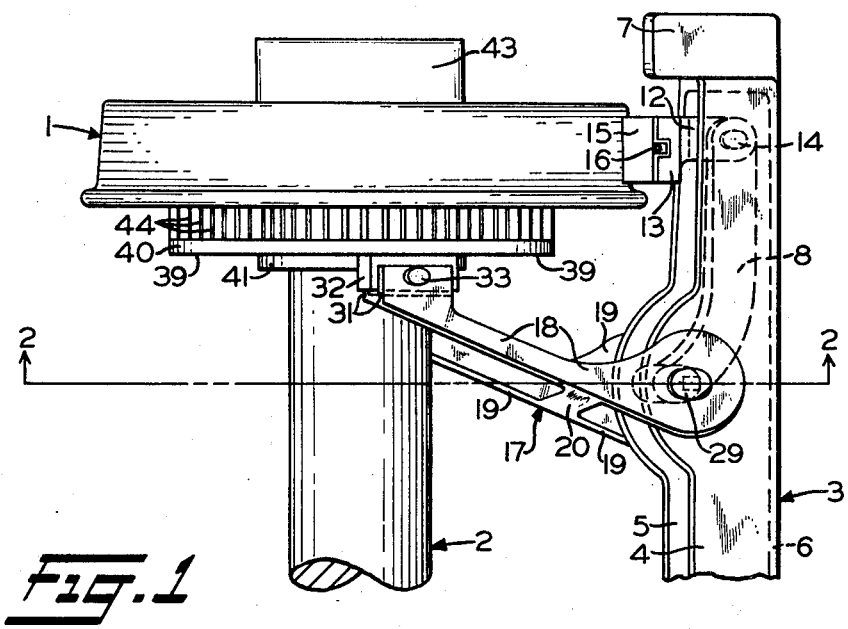
FIG. 1 is a plan or top view of a brake apparatus carried at one end of a brake beam for applying a braking force to one wheel of a wheel and axle assembly showing the manner by which three brake shoes for braking the one wheel, and a brake disc secured thereto, are pivotally carried by the brake beam adjacent one end thereof.
Figure 2:
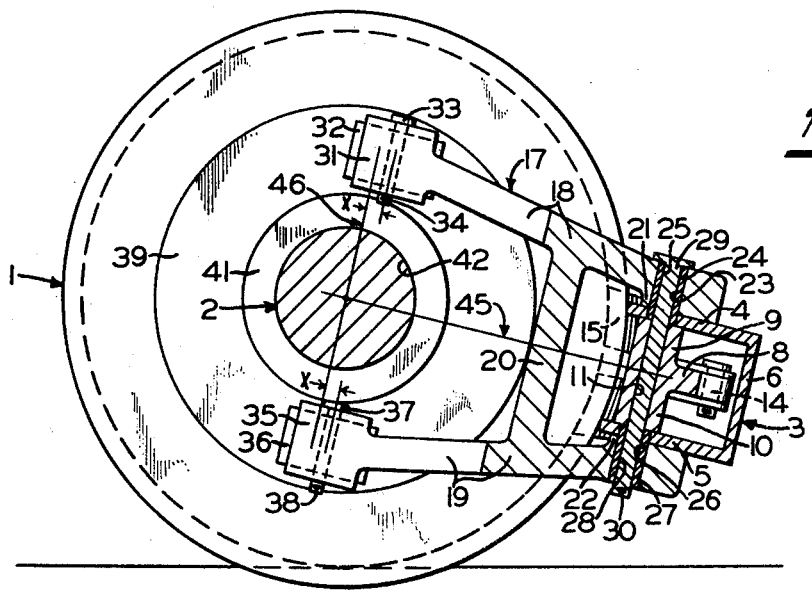
FIG. 2 is a front elevational view, partly in section, taken along the line 2—2 of FIG. 1, looking in the direction of the arrows, and showing certain details not made apparent in FIG. 1.

Referring to FIGS. 1 and 2 of the drawing, the reference numeral 1 designates a wheel secured to an axle 2 adjacent one end thereof, it being understood that a like wheel is secured to the other end of this axle 2 to form a wheel and axle assembly for such as, for example, a two-axle four-wheel railway vehicle truck.

The tread of the wheel 1 forms a peripheral annular braking surface thereby enabling the mass of this wheel 1 to constitute a first heat sink in which heat energy may be stored and from which heat may be dissipated by radiation as the wheel rotates at a high speed while a railway vehicle travels along a track.

A brake beam 3, only one-half of which is shown in FIG. 1, may comprise one of a pair of brake beams of a brake rigging for a two-axle four-wheel railway vehicle truck such as, for example, the brake rigging shown and described in U.S. Pat. No. 2,958,398 issued Nov. 1, 1960 to George K. Newell, and assigned to the assignee of the present invention. It will be understood that the end of the brake beam 3 that is not shown in FIG. 1 carries the same elements operative in the same manner as hereinafter described for the end of this beam shown in FIG. 1. This pair of brake beams is symmetrically arranged on opposite sides of a truck bolster (not shown) and are movably supported at each end on the side frame members (not shown) of the railway vehicle truck.

The brake beam 3 may be in the form of a casting that in cross section has the shape of a standard channel, such as a U-channel, this channel having an upper flange 4 and a lower flange 5 which are connected by a web 6 that is integral with these flanges. At each end of the brake beam 3, a guide foot 7, in the form of a flat L-shaped member, has one leg thereof cast integral with the flanges at this end of the brake beam. The other leg of each guide foot 7 is slidably supported in a grooved wear plate and guide member (not shown), this wear plate and guide member being secured to a truck side frame (not shown). The wear plate and guide members and guide feet serve to support the brake beam 3 at the proper height above the rails, (that is somewhat below the horizontal diameter of the wheels) the groove in the wear plate and guide members being at a slight angle, such as, for example fourteen degrees, to the horizontal to permit bodily movement of the brake beam 3 in a direction radially of the associated wheels 1 when a brake application is effected.

As best shown in FIG. 1 of the drawing, a substantially L-shaped lever 8 is disposed between the upper flange 4 and lower flange 5 of the brake beam 3. One end of this lever 8 has formed integral therewith as shown in FIG. 2, a pair of oppositely extending bosses 9 and 10, the length of these bosses being such that the upper end of the boss 9 abuts the lower or inside surface of the upper flange 4, and the lower end of the boss 10 abuts the upper or inside surface of the lower flange 5, as is apparent from FIG. 2. Extending through the lever 8 and the bosses 9 and 10 is a polygonal opening 11 which, for example, may be square in cross-section, the purpose of this opening 11 being hereinafter made apparent.

As shown in FIG. 1, the other end of the lever 8 is disposed between the jaws of a clevis 12 that is integral with one side of a brake head 13 and operatively connected to this clevis 12 by a pin 14 the opposite ends of which are anchored in the jaws of this clevis. A braking element or brake shoe 15, preferably of the type shown and described in U.S. Pat. No. 2,686,140 issued Aug. 10, 1954 to Charles L. E. de Gaugue, Jr. and assigned to Johns-Manville Corporation, New York, N.Y., is secured to the other side of the brake head 13 by a brake shoe key 16 for braking engagement with the tread surface of the wheel 1.

A yoke 17, shown in FIGS. 1 and 2, comprising a pair of nonparallel arms 18 and 19 that intermediate their ends are integral with the respective opposite end of a cross member 20. As shown in FIG. 2, the right-hand end of the arm 18 is provided with an inwardly extending boss 21. Likewise, the arm 19 at its right-hand end is provided with an inwardly extending boss 22 that faces in the direction of the boss 21 and is coaxial therewith.

Extending through the upper flange 4 of the brake beam 3, the boss 21 and arm 18 of the yoke 17 is a bore 23 in which is disposed a wear bushing 24 through which extends a polygonal opening 25 which, for example, may be square in cross section. It is to be understood that the diameter of that portion of the bushing 24 extending through the upper flange 4 is slightly smaller than the remainder in order that this bushing have a press fit with the arm 18 and a turning fit with this upper flange 4 of the brake beam 3.

Likewise, extending through the lower flange 5 of the brake beam 3, the boss 22 and arm 19 of the yoke 17 is a bore 26 in which is disposed a wear bushing 27 through which extends a polygonal opening 28 which, for example, may be square in cross section. It is to be understood that the diameter of that portion of the bushing 27 extending through the lower flange 5 is slightly smaller than the remainder in order that this bushing have a press fit with the arm 19 and a turning fit with this lower flange 5 of the brake beam 3.

A headed pin 29, that has a polygonal cross section which, for example, may be square, extends through opening 25 in bushing 24, opening 11 in lever 8 and the bosses 9 and 10 integral therewith and opening 28 in bushing 27. The lower end of this pin 29, as viewed in FIG. 2, is provided with a bore (not shown) for receiving a cotter pin 30 which prevents removal of the headed pin 29 by vibration which may occur while vehicle is traveling at a high speed.

It will be understood from the foregoing description of the headed pin 29, the bushings 24 and 27 and the opening 11 in lever 8 that this pin 29 so connects the yoke 17 and the lever 8 to the brake beam 3 that this yoke 17 and lever 8 are rockable as a unit with respect to this brake beam 3 since the bushing 24 has a turning fit in that portion of the bore 23 extending through the upper flange 4 of this brake beam 3 and the bushing 27 has a turning fit in that portion of the bore 26 in the lower flange 5 of this brake beam.

As shown in FIGS. 1 and 2, the left-hand end of the arm 18 of yoke 17 is provided with a clevis 31 between the jaws of which is disposed a braking element or brake shoe 32 that is operatively connected to this clevis 31 by a headed pin 33 and a cotter pin 34 this cotter pin 34 only appearing in FIG. 2.

Likewise, the left-hand end of the arm 19 of yoke 17 is provided with a clevis 35 between the jaws of which is disposed a braking element of brake shoe 36 that is operatively connected to this clevis 35 by a headed pin 37 and a cotter pin 38.

The brake shoes 32 and 36 are preferably of the type shown and described in the above-mentioned U.S. Pat. No. 2,686,140 and are for braking engagement with an annular braking surface or face 39 that is formed on the lower side, as viewed in FIG. 1, of a brake disc 40 in surrounding relation to a hub 41 having a bore 42 (FIG. 2) the size of this bore 42 being such as to provide a pressed fit between this hub 41 and the axle 2.

As shown in FIG. 1, the portion of the axle 2 outboard of the wheel 1 is carried in a journal box 43 which is integral with a railway vehicle truck side frame (not shown). It will be understood that the other end (not shown) of the axle 2 is likewise carried in a journal box (not shown) that is integral with the other truck side frame (not shown) of the railway vehicle truck.

In order to provide for dissipation of heating by radiation from the brake disc 40, this disc, on the side thereof opposite the braking surface 39, is provided, as shown in FIG. 1, with a plurality of arcuately spaced-apart fins 44.

When a pair of brake beams, each like the brake beam 3 shown in the drawing, constitutes the two brake beams of a brake rigging that is substantially the same as that shown and described in U.S. Pat. No. 2,958,398 issued Nov. 1, 1960 to George K. Newell, and assigned to the assignee of the present invention, except for the addition to each beam of the yokes 17, brake shoes 32 and 36 carried by each yoke 17 and brake discs 40 carried on each axle, the brake shoes 15, 32 and 36 carried by each of these two brake beams, are operated into and out of braking engagement with the peripheral surface of the wheels 1 and the braking surface 39 of brake disc 40 by means of a pair of fluid motors or brake cylinders (not shown), one secured in any suitable manner to each brake beam.

When fluid under pressure is simultaneously supplied to a pressure chamber (not shown) in the brake cylinder carried by each brake beam, it is effective to move the pistons (not shown) within the two brake cylinders and these cylinders in opposite directions and likewise the two brake beams in opposite directions. As these two brake beams move in opposite directions, the braking faces of the brake shoes 15 carried adjacent the respective opposite ends of the brake beam 3 (FIGS. 1 and 2) are brought into braking contact with the peripheral tread surface of the wheels 1 secured to the respective opposite ends of the axle 2.

Referring to FIGS. 1 and 2, it will be noted that since the headed pin 29 extends through the upper flange 4 and the lower flange 5 of the brake beam 3, this brake beam 3, subsequent to the brake shoe 15 being brought into braking engagement with the tread surface of the wheel 1, will transmit a force through this pin 29, which may be square in cross section as hereinbefore noted, to the yoke 17. It is apparent that this force acts in the direction of the left hand, as viewed in FIG. 1, and along the line denoted in FIG. 2 by the reference numeral 45.

It will be appreciated that this force transmitted from the brake beam 3 through the pin 29 to the yoke 17 and acting in the direction of the left hand, as viewed in FIG. 1, may be resolved into two components, one component acting along a line that passes through the center of the pin 29 and is parallel to the arms 18 and 19 of this yoke 17 and the other perpendicular thereto. It is apparent that a force equal to one-half of this component force acting parallel to the arms 18 and 19 is transmitted through the arm 18 to the pin 33 and a force equal to one-half of this component force is transmitted through the arm 19 to the pin 37.

Moreover, it is apparent from FIG. 1 that the force transmitted to the pin 33 by the arm 18 acts along a line that passes through the center of this pin 33 and is parallel to this arm 18.

Likewise, it will be appreciated that the force transmitted to the pin 37 (FIG. 2) by the arm 19 acts along a line that passes through the center of this pin 37 and is parallel to this arm 19.

Referring to FIG. 1 and considering the force that is transmitted to the pin 33, which force is acting in the direction of the left hand and along a line that passes through the center of this pin 33 and is parallel to the arm 18, it will be appreciated that this force may be resolved into two components, one component of which acts horizontally in the direction of the left hand, as viewed in FIG. 1, and the other component of which acts in a direction perpendicular to the braking surface 39 on the brake disc 40.

Likewise, the force transmitted to the pin 37 may be resolved into two components one of which acts in the direction perpendicular to the braking surface 39, it being apparent that this force that presses the brake shoe 36 against the braking surface 39 is equal in magnitude to the force that presses the brake shoe 32 against this braking surface.

From the foregoing, it is apparent that when a brake application is effected, the brake shoes 32 and 36 are pressed against the braking surface 39 on the brake disc 40 with equal braking forces simultaneously as the brake shoe 15 is pressed against the tread surface of the wheel 1. It will be understood of course that the above statement applies to the three brake shoes 15, 32 and 36 adjacent each end of each of the two brake beams of the brake rigging, each of these two brake beams being identical and constructed in accordance with the foregoing description of brake beam 3 shown in FIGS. 1 and 2 of the drawing.

The above-described brake application may be released by venting to atmosphere the fluid under pressure previously supplied to the pressure chamber in the brake cylinder carried by each of the two brake beams.

It will be appreciated that the ratio of the force applied by the brake shoe 15 to the tread surface of the wheel 1 to the force applied by the brake shoes 32 and 36 to the braking surface 39 on the brake disc 40 may be varied accordingly as the length of the arms 18 and 19 of the yoke 17 is varied. It should be noted that this ratio remains substantially the same if the brake shoe 15 wears away at a faster rate than the brake shoes 32 and 36, or if these brake shoes 32 and 36 wear away at a faster rate than the brake shoe 15.

Referring to FIG. 2 of the drawing, it will be noted that a line denoted by the reference numeral 46, which passes through the center of the axle 2 and is perpendicular to the line 45 that also passes through the center of this axle 2, is off-set a distance X from the axis of each of the pins 33 and 37 that respectively pivotally connect the brake shoe 32 to the arm 18 of the yoke 17 and the brake shoe 36 to the arm 19 of this yoke.

Accordingly, by reference to FIGS. 1 and 2, it will be appreciated that if the brake shoe 15 wears away at a faster rate than the brake shoes 32 and 36, the force transmitted from the brake beam 3 through the pin 29 to the lever 8 will act through the pin 14, clevis 12 and brake head 13 to maintain the braking face of the shoe 15 in braking engagement with the tread surface of the wheel 1 as this wear occurs.

Moreover, since the pin 29 and openings 11, 25 and 28 are polygonal in cross section, this pin 29, as the brake shoe 15 wears away faster than the brake shoes 32 and 36, will transmit a force through the arms 18 and 19 to shift the brake shoes 32 and 36 in the direction of the line 46 (FIG. 2) thereby decreasing the distance X. It will be appreciated that this shifting of the brake shoes 32 and 36 in the direction of the line denoted by the reference numeral 46 in FIG. 1 decreases the braking radius of these shoes 32 and 36 such a small amount that the resulting reduction in the brake horsepower converted by these shoes from mechanical energy into heat energy and stored in the brake disc 40 for radiation therefrom via the fins 44 is negligible.

It will be appreciated from the foregoing that if the tread surface of the wheel 1 wears away, the braking surface of the brake shoe 15 will be maintained in braking engagement with the tread surface of this wheel 1 notwithstanding this wear and the reduction in the brake horsepower converted by the brake shoes 32 and 36 from mechanical energy into heat energy and stored in the brake disc 40 is negligible.

Furthermore, it will be understood that if the braking surfaces of the brake shoes 32 and 36 wear away at a faster rate than the brake shoe 15, the above-described component forces acting through the respective pins 33 and 37 in a direction perpendicular to the braking surface 39 on the brake disc 40 will press these brake shoes 32 and 36 into braking engagement with this braking surface 39 as these shoes 32 and 36 wear away with substantially the same force.

It will be apparent from FIGS. 1 and 2 that if the brake shoes 32 and 36 wear away at a faster rate than the brake shoe 15, the lever 8 and the yoke 17, connected to this lever 8 by the pin 29 which has a polygonal cross section, will be rocked clockwise, as viewed in FIG. 1, as a unit about the pin 14.

Furthermore, it will be apparent from FIGS. 1 and 2 that this clockwise rocking of the lever 8 and yoke 17 about the pin 14 is effective to decrease the distance, denoted by X in FIG. 2, between the line denoted by the reference numeral 46 and the axes of the pins 33 and 37. This increase in the distance X increases slightly the braking radius of the brake shoes 32 and 36 and therefore, the brake horsepower converted by these brake shoes from mechanical energy into heat energy and stored in the brake disc 40. The resultant rise in temperature of the brake disc 40 would be negligible.

Having now described the invention what I claim as new and desire to secure by Letters Patent, is:

1. Multi-brake shoe means for transmitting braking forces to multi-braking surface formed at substantially right angles to each other on an element to be braked, said multi-brake shoe means comprising:
   a. a member movable toward and away from the multi-braking surfaces on the element to be braked,
   b. a plurality of braking elements each having a braking face via which a braking force is transmitted to a corresponding braking surface when moved into braking engagement therewith, and, wherein the improvement comprises:

c. a single rigid means rockably mounted on said movable member and having said plurality of braking elements so rockably mounted on and carried by said means so as to enable said plurality of braking elements to transmit braking forces to their corresponding braking surfaces notwithstanding the rate of wear of certain of said braking elements exceeding the rate of wear of certain other of said braking elements.

2. Multi-brake shoe means, as recited in claim 1, further characterized in that each of said plurality of braking elements is operatively connected to said rockable means by means of a clevis having a pair of jaws and a pin having its respective opposite ends anchored in the jaws of the corresponding clevis.

3. Multi-brake shoe means, as recited in claim 1, further characterized by a brake head for carrying on one side thereof one of said plurality of braking elements and having a clevis extending from the other side, said clevis having a pair of spaced-apart jaws, by a fulcrum pin carried by said mounted means and having its opposite ends anchored in the jaws of said clevis, said clevis and fulcrum pin enabling rocking of said one brake element with respect to said rockably mounted means.

4. Multi-brake shoe means, as recited in claim 1, further characterized in that said movable member comprises a brake beam having an upper and a lower flange and a web integral at one end with said upper flange and at the other end with said lower flange, and said rockably mounted means is disposed between said flanges and rockably mounted with respect thereto.

5. Multi-brake shoe means, as recited in claim 1, further characterized in that said rockably mounted means comprises:
   a. a lever provided adjacent one end with a polygonal opening and having one of said plurality of braking elements rockably mounted adjacent the other end,
   b. a yoke having two spaced-apart and connected arms, each arm having another of said plurality of braking elements rockably mounted adjacent one end thereof and carrying adjacent its other end an element having a polygonal opening and providing a turning fit with said movable member, and
   c. a pin polygonal in cross section and extending through the polygonal opening in said lever and said elements to thereby rigidly connect said lever and said yoke to form said means rockable mounted on said movable member.

6. A multi-brake shoe means, as recited in claim 5, further characterized in that said two spaced-apart arms lie in nonparallel planes that diverge in the direction of said elements carried thereon.

7. In combination:
   a. a rotatable member to be braked constituting a mass that has formed thereon a plurality of braking surfaces, formed at substantially right angles to each other, wherein the improvement comprises:
   b. a plurality of braking elements, each effective to transmit brake horsepower to a corresponding one of said plurality of braking surfaces upon movement into braking engagement therewith, the mechanical energy of said braking horsepower being converted to heat energy that is stored in and dissipated from that portion of said mass of said rotatable member on which the corresponding braking surface is formed,
   c. a member movable toward and away from said rotatable member, and
   d. a single rigid means having a pivotal connection and carrying each of said plurality of braking elements and being so pivotally connected to said member that upon movement of said movable member toward said rotatable member each braking element is brought into braking engagement with its corresponding braking surface, said pivotal connections so cooperating with one another that an increase in the rate of wear of any of said plurality of braking elements relative to the rate of wear of the remainder of said plurality of braking elements is ineffective to reduce the braking horsepower transmitted by each braking element to its corresponding braking surface on the mass of said rotatable member.

8. The combination, as recited in claim 7, further characterized in that said rotatable member to be braked comprises a wheel, and said plurality of braking surfaces constitute the tread surface of said wheel and a disc secured to one side of said wheel.

9. The combination, as recited in claim 7, further characterized in that each of said plurality of braking elements comprising a brake shoe, and said means having a pivotal connection with each of said plurality of braking elements comprises:
   a. a lever having a pivotal connection at one end with one of said brake shoes and a polygonal opening adjacent the other end,
   b. a yoke having a pair of spaced-apart arms, each arm having a pivotal connection at one end with another one of said brake shoes and carrying adjacent its other end an element having a polygonal opening and a turning fit with said movable member, and
   c. a pin polygonal in cross section and extending through the polygonal opening in said lever and said elements to thereby rigidly connect said lever and said yoke to form said means pivotally connected to said movable member.

10. The combination, as recited in claim 9, further characterized in that said movable member is so disposed with respect to said rotatable member as to be movable toward and away from said rotatable member in a first plane that forms a chosen angle with the horizontal and passes through the axis of said rotatable member, and the pivotal connection of each arm with another one of said brake shoes lies in a second plane that forms a right angle with said first plane and is off-set in the direction of said pin from a third plane that is parallel to said second plane and passes through the axis of said rotatable member whereby upon the rate of wear of said one brake shoe having a pivotal connection with one end of said lever exceeding the rate of wear of said brake shoes having a pivotal connection with one end of said arms of said yoke, said brake shoes having a pivotal connection with one end of said arms are moved in the direction to decrease said off-set between said second and third planes.

11. The combination, as recited in claim 10, further characterized in that said movable member comprises a brake beam having a pair of flanges disposed on the respective opposite sides of said first plane in spaced-apart parallel relation thereto and connection by a flange integral therewith, each flange having said turning fit with said element carried adjacent the other end of one of said arms whereby said yoke and said lever are rockably mounted as a unit on said brake beam whereby the brake horsepower transmitted by each brake shoe to its corresponding braking surface remains substantially constant notwithstanding the rate of wear of one of said plurality of brake shoes exceeding the rate of wear of the remainder of said plurality of brake shoes.

12. The combination, as recited in claim 7, further characterized in that said movable member is so disposed with respect to said rotatable member as to be movable toward and away from said rotatable member in a plane that forms a chosen angle with the horizontal and passes through the axis of said rotatable member.

* * * * *

UNITED STATES PATENT AND TRADEMARK OFFICE
CERTIFICATE OF CORRECTION

PATENT NO. : 4,008,789
DATED : February 22, 1977
INVENTOR(S) : Quentin T. Clemmons It is certified that error appears in the above-identified patent and that said Letters Patent are hereby corrected as shown below:

Column 6, line 60, "surface" should be --surfaces--

Column 7, line 22, before "by" insert --and--

Column 8, line 7, after "said" insert --movable-- line 27, "comprising" should be --comprises-- line 67, "connection" should be --connected--

Signed and Sealed this

Sixth Day of December 1977

[SEAL]

Attest:

RUTH C. MASON
*Attesting Officer*

LUTRELLE F. PARKER
*Acting Commissioner of Patents and Trademarks*